(12) United States Patent
Stubiger

(10) Patent No.: US 8,402,566 B2
(45) Date of Patent: Mar. 26, 2013

(54) STITCHED SEAM STRUCTURE, ITEM OF CLOTHING COMPRISING A STITCHED SEAM STRUCTURE AND METHOD FOR PRODUCING A STITCHED SEAM STRUCTURE

(75) Inventor: Werner Stubiger, Neubiberg (DE)

(73) Assignee: W. L. Gore & Associates, Inc., Newark, DE (US)

( * ) Notice: Subject to any disclaimer, the term of this patent is extended or adjusted under 35 U.S.C. 154(b) by 377 days.

(21) Appl. No.: 12/682,728

(22) PCT Filed: Oct. 6, 2008

(86) PCT No.: PCT/EP2008/008426
§ 371 (c)(1),
(2), (4) Date: Jul. 8, 2010

(87) PCT Pub. No.: WO2009/052937
PCT Pub. Date: Apr. 30, 2009

(65) Prior Publication Data
US 2010/0269245 A1    Oct. 28, 2010

(30) Foreign Application Priority Data
Oct. 19, 2007 (DE) .......................... 10 2007 050 174

(51) Int. Cl.
*A41D 27/24* (2006.01)
(52) U.S. Cl. ................. 2/275; 428/57; 428/102
(58) Field of Classification Search ............ 428/57, 428/102
See application file for complete search history.

(56) References Cited

U.S. PATENT DOCUMENTS

| | | | |
|---|---|---|---|
| 3,303,515 A * | 2/1967 | Lash | 2/275 |
| 3,953,566 A | 4/1976 | Gore | |
| 4,187,390 A | 2/1980 | Gore | |
| 4,194,041 A | 3/1980 | Gore et al. | |
| 4,493,870 A | 1/1985 | Vrouenraets et al. | |
| 5,885,679 A | 3/1999 | Yasue et al. | |
| 6,079,343 A * | 6/2000 | Wong | 112/475.09 |
| 7,434,272 B2 * | 10/2008 | Hannon et al. | 2/275 |

* cited by examiner

*Primary Examiner* — Katherine Moran
(74) *Attorney, Agent, or Firm* — Amy L. Miller

(57) ABSTRACT

A seam joining structure (1) includes a first material web (10) with a first barrier layer (42) and with a first edge (14) on an outer boundary of the first material web (10), a second material web (30) with a second barrier layer (42) and with a second edge (34) on an outer boundary of the second material web (30), as well as at least one seam (21) that joins the first and second material webs (10, 30) in a seam area (3) to form a first seam allowance (13) between the seam (21) and the first edge (14) of the first material web (10) and to form a second seam allowance (33) between seam (21) and the second edge (34) of the second material web (30). The first and second material webs (10, 30) are arranged one above the other in seam area (3) and the second seam allowance (33) is folded around the first edge (14) of the first material web (10) and covers the at least one seam (21) to form a seam cover (2), whereby the seam cover (2) is joined in the seam area (3) to the first material web (10). This seam-joining structure can contribute to creating waterproof functional clothing with high wearing comfort.

31 Claims, 3 Drawing Sheets

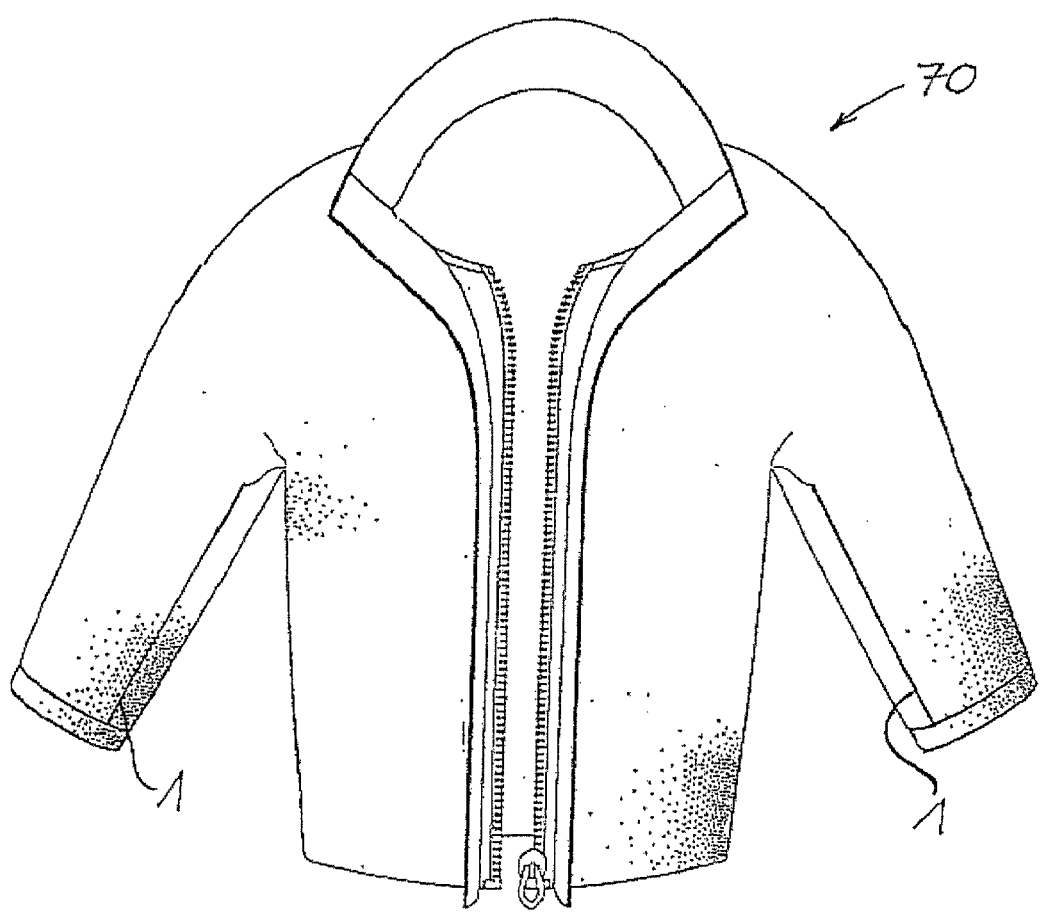

Figure 1:
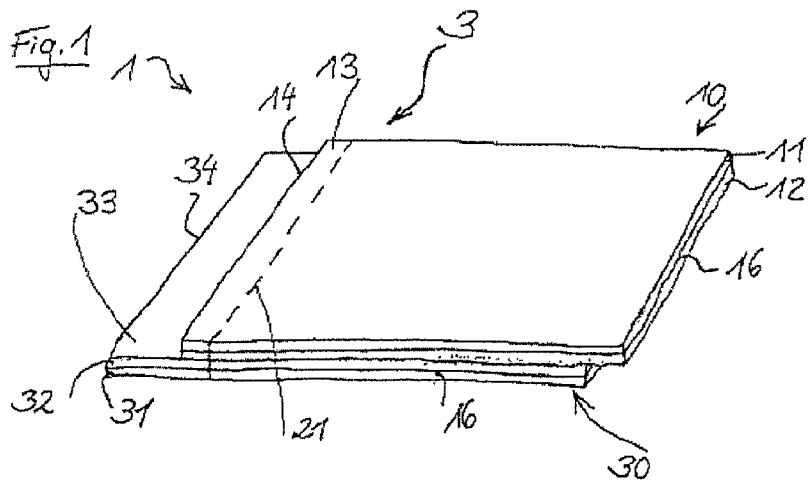

STITCHED SEAM STRUCTURE, ITEM OF CLOTHING COMPRISING A STITCHED SEAM STRUCTURE AND METHOD FOR PRODUCING A STITCHED SEAM STRUCTURE

The present invention relates to a seam joining structure, comprising a first material web with a first barrier layer and a second material web with a second barrier layer and with at least one seam that joins the first and second material webs in a seam area. The invention also concerns a clothing article with a seam joining structure, as well as a method for producing such a seam-joining structure.

Clothing articles with a water-permeable outer material can be made waterproof by arranging a waterproof layer, generally referred to as a barrier layer, on the inside of the outer material. To make such clothing articles waterproof and water-vapor-permeable and therefore breathable, an outer material is typically used that is water-vapor-permeable, but also water-permeable, and a waterproof, water-vapor-permeable functional layer (barrier layer) is arranged inside it. A textile liner layer is generally arranged on the side of the functional layer facing the body of the user of the clothing article.

Use of a multilayer laminate, such as a two-ply laminate with a functional layer and a liner layer or a three-ply laminate with an outer material layer, a functional layer, and a textile layer, for waterproof, water-vapor-permeable clothing articles is known.

There are clothing articles that are stitched together from several pieces, in order to achieve a specific fit, strength, durability, and/or optical appearance. When multilayer laminates of the above-mentioned type are used, which have both an outer material and a functional layer, individual cuts of the clothing article are cut out from laminate webs and then joined to the clothing article, usually by sewing. Generally, two laminate webs of the clothing article are thereby joined to each other by a sewing seam in a seam area. However, the functional layer of the laminate is also perforated by such sewing, so that water-tightness of the functional layer is adversely affected at the seam location, and undesired leaks can occur at the seam location. In order to make the seam location also waterproof, i.e., in order to retain the overall water-tightness of the clothing article, it is generally common to cover the seam with a waterproof seam seal, the seam sealing occurring by a separately applied seam strip, which, in turn, is waterproof.

This type of arrangement is known, in particular, from US 2005/0081281 A1, according to which a seam connection between two laminates is sealed by an additionally applied seam strip. Application of an additional seam strip generally has the drawback that the thickness of the laminate is increased at the seam-joining site, which can restrict the wearing comfort of the clothing article. For this purpose, it is proposed in the document mentioned that at least one part of the textile laminate be removed in the area being sealed, for example, by paring, in order to reduce the thickness of the laminate in the seam area before the seam strip is applied to the seam site. However, a drawback of such an arrangement remains, in that the clothing article becomes comparatively stiff at the seam site with application of the additional seam strip, which again compromises wearing comfort.

Joining seams that are sealed for seam sealing by a seam strip are generally quite stiff and lead to visible seam-strip edge impressions on the outer material part (so-called outerwear), especially after frequent washing. The seam strip itself often also interrupts the continuity of the inner material part (so-called backing) in color or condition. The additional seam strip also causes thickening of the seam, especially at intersections and T-sites, as already indicated above.

Another type of joining structure for waterproof textile materials is described in U.S. Pat. No. 5,885,679 A, according to which two material webs are joined to each other in a seam area, wherein case one of the material webs is turned over in the seam area, so that a bulging seam is produced. A hot-melt adhesive is provided, both in the trough formed by turning over of this material web and on the joining site between this material web and the other material web, so that the overlapping layers of the laminate are glued to each other in the seam area. The seam connection created in this way, however, has the drawback that one of the seams on both sides of the seam connection is accessible from the outside, so that the hazard of a leak at the seam site still exists, for example, if the glue becomes porous over time or by frequent washing or has defect sites.

The present invention is based on the task of providing a seam-joining structure of the type just mentioned that contributes to creating waterproof functional clothing with high wearing comfort.

The present invention concerns a seam-joining structure with the features as described in the claims. The invention also concerns a clothing article with such a seam-joining structure according to the features as described in the claims. The invention also concerns a method for production of a seam joining structure according to the features as described in the claims.

The seam joining structure according to the invention includes a first material web with a first barrier layer and with a first edge on an outer boundary of the first material web, a second material web with a second barrier layer and with a second edge on the outer boundary of the second material web, and at least one seam that joins the first and second material webs in a seam area to form a first seam allowance between the seam and the first edge of the first material web and to form a second seam allowance between the seam and the second edge of the second material web. The first and second material webs are arranged one above the other in the seam area. The second seam allowance is folded around the first edge of the first material web and covers the at least one seam to form a seam covering. The seam covering is joined to the first material web in the seam area.

Such a seam joining structure according to the invention then has the advantage that a separate seam band is no longer required to produce a waterproof seam between the first and second material webs. In the first place, this results in a material saving during production of a clothing article and, in the second place, it results in a cost reduction in the manufacturing process. The drawback that a color or material difference between such a seam band and the reverse material of the clothing article develops can also be avoided. Higher tear strength compared to a merely glued seam, a softer seam-joining site and a comparatively thin seam are obtained as additional advantages, which also has the advantage that no or only a slight edge impression is formed on the outer material of the clothing article. Another advantage is the narrower seam image, in comparison with sealing with a separate seam band, which must be made comparatively wide for attaching to the material webs on the edge side.

To produce a seam-joining structure according to the invention, a first material web is initially prepared with a first barrier layer and with a first edge on an outer boundary of the first material web. A second material web with a second barrier layer and with a second edge in an outer boundary of the second material web is also provided. A first side of the first material web is positioned on a first side of the second material web, so that the second edge of the second material web protrudes beyond the first edge of the first material web. To join the two material webs, at least one seam is formed in a seam area, so that a first seam allowance between the seam and the first stage of the first material web and a second seam allowance between the seam and the second edge of the first material web is formed. The second seam allowance is folded around the edge of the first material web, so that the second seam allowance covers the at least one seam to form a seam covering, the seam covering being attached to the first material web in the seam area.

In particular, after the step of forming the at least one seam as the first seam, the following steps can be performed:

After formation of the first seam for joining of both material webs in the seam area, a part of the second material web adjacent to the seam area is folded around a side facing away from the first material web. A second seam is then formed, which is arranged parallel to the first seam and between the first seam and the first edge of the first material web, this second seam-joining the first material web, the second material web, and the folded part of the second material web. The second seam allowance is then folded around the first edge of the first material web, so that the second seam allowance covers the first and second seam to form a seam covering, this seam covering being attached to the first material web in the seam area.

According to one embodiment of the invention, the seam covering is attached directly to the first material web in the seam area, so that, in this way, effective waterproof covering of the first and second seam is produced. In particular, the seam covering is attached directly to the first seam allowance of the first material web in the seam area.

The invention is particularly applicable in a case, wherein at least one of the first and second seams includes a sewing seam or forms such a sewing seam, through which comparatively high tear strength of the seam-joining structure can be achieved. On the other hand, effective sealing of the seam-joining site is achieved by the seam covering, without having to use a separate seam strip for this purpose.

In another embodiment of the invention, the seam covering is attached liquid-tight to the first material web in the seam area. In particular, the seam covering is joined continuously to the first material web in the seam area by means of a glue that creates a liquid-tight seal at the joining site. Such a glue can be a glue from the group of silicones. With this step, sealing of the seam site is further improved, whereby a relatively soft seam can be created by using a correspondingly flexible glue.

In a similar way, according to one modification, the folded part of the second material web is attached to an unfolded part of the second material web so as to be liquid-tight in the seam area. In particular, the folded part of the second material web is continuously joined in the seam area to the unfolded part of the second material web by means of a glue that creates a liquid-tight seal at the joining site. This glue can also be a glue from the silicone group.

A seam joining structure created in this way can be part of a clothing article wherein a first material web is joined to a second material web by a seam-joining structure. The clothing article can be an outer clothing article, such as a jacket, trousers, a shirt, a blouse, a coat, overalls, etc., or it can be part of a hat, glove, or shoe.

Thanks to the seam joining structure according to the invention, a clothing article can be produced that is reversible (reversible jacket), so that an outer material part of the clothing article can be used as an inner material part and vice versa, since the seam-joining structure can, in principle, be made waterproof on both sides. The seam-joining structure can be configured so that no color or material differences occur between the seam location and the outer material part or the inner material part. The comparatively thin seam image also has a positive effect at this location.

Other embodiments and modifications of the invention are stated in the dependent claims.

The invention will be explained further below with reference to the diagrams shown in the drawings.

Figure 2:
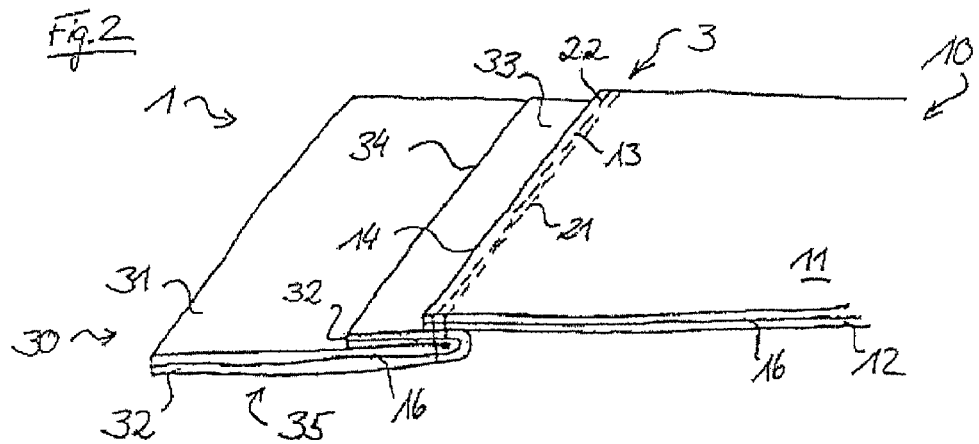
Figure 3:
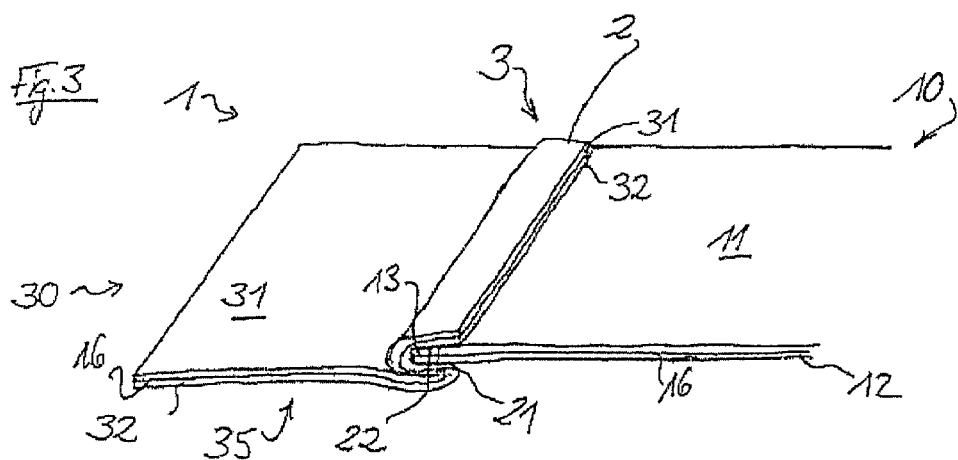
Figure 4:
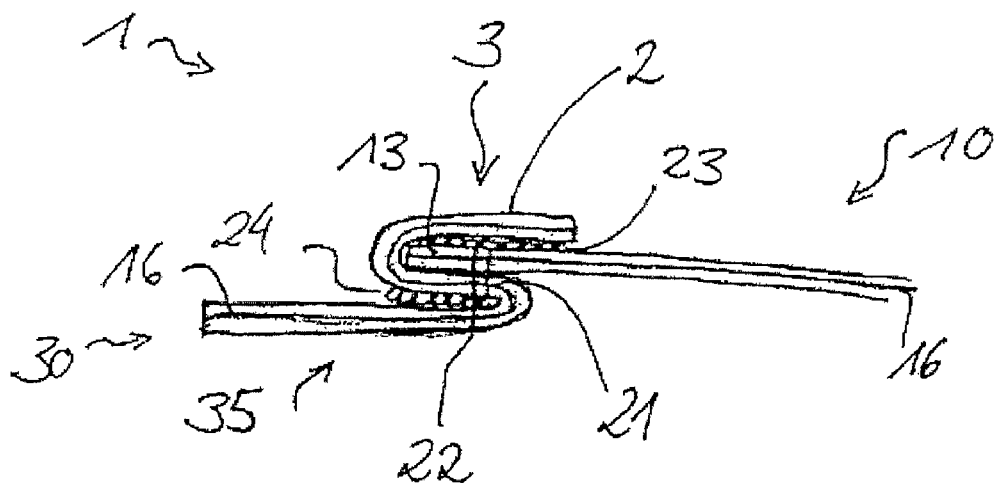
Figure 5:
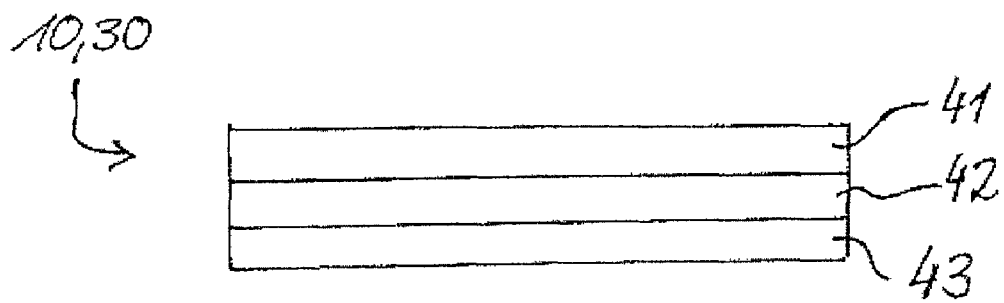

FIG. 1 shows a schematic perspective view of two material webs placed one above the other to form a seam connection and joined to each other by a seam, FIG. 2 shows a schematic perspective view of the seam-joining structure in a subsequent processing step, FIG. 3 shows a schematic perspective view of the seam joining structure in another processing step, FIG. 4 shows a cross-section through a seam-joining structure formed in the previous processing steps, FIG. 5 shows a schematic cross-section of a multilayer laminate, which can be used as the corresponding material web according to FIGS. 1 to 3, FIG. 6 shows an example of a clothing article with a seam-joining structure according to the invention.

Production of a seam joining structure according to the principles of the present invention will be further explained below with reference to FIGS. 1 to 4. For this purpose, the material webs are only depicted very schematically in FIGS. 1 to 4, in order to better show the seam-joining structure. A variety of materials can be used as material webs being joined, for example, multilayer laminates, such as a two-ply laminate with a functional layer, or also a three-ply laminate with a textile layer, for example, an outer material layer, a functional layer, and a textile layer. However, in principle, any type of material web is suitable for producing an essentially waterproof seam connection that can be used to produce a barrier layer with respect to penetrating water.

For example, a three-ply laminate according to FIG. 5 is used as material layers 10, 30, as will be further explained with reference to FIGS. 1 to 4, that is suitable for forming a waterproof, but water-vapor-permeable and therefore breathable clothing article. Such a three-ply laminate, as shown in FIG. 5, has a textile material 41, like an outer material, which is water-vapor-permeable, and also water-permeable. A waterproof, water-vapor-permeable barrier layer 42 (functional layer) is arranged on the inside of outer material 41. The waterproof, water-vapor-permeable layer 42 has a waterproof, water-vapor-permeable membrane, which can be designed, in turn, to be one-ply or also multilayered. For example, the membrane can be a porous membrane of expanded PTFE (ePTFE). An ePTFE layer is provided with a water-vapor-permeable, continuous (non-porous) polyurethane layer. The functional layer can also contain any material that is suitable for production of a barrier layer.

A textile liner layer 43 is arranged on the side of the functional layer 42 facing the body of the user of the clothing article. The textile layers 41, 43 can contain woven, warp-knit, knit-fabric, and/or a non-woven material.

A clothing article of the general type, as described above, which is waterproof, but water-vapor-permeable, can be produced with a multilayer laminate, as shown in FIG. 5, whereby wearing comfort is correspondingly increased by the water-vapor permeability. As an alternative or in addition, it is possible to use a barrier layer that is air-tight (wind-tight) and/or waterproof and water-vapor-permeable.

The barrier layer can be water-vapor-permeable and gas-tight (air-tight), and the barrier layer can also be water-vaporpermeable and liquid-tight (waterproof), and the barrier layer can also be water-vapor-permeable, gas-tight, and liquid-tight.

With reference to FIGS. 1 to 4, two material webs 10 and 30 are initially prepared, which are to be joined to each other by a seam. The material web 10 has a first side 12 and an opposite second side, such as a backing 11. The first side 12 is an outer material part, for example, which faces outward when the clothing article is worn. The second side 11 correspondingly forms an inner material part of the clothing article, which faces the wearer of the clothing article. When a multilayer laminate is used, as shown in FIG. 5, the textile layer 41 forms the outer material part 12, whereas the textile layer 43 forms the inner material part 11. The barrier layer 42, which, in the interest of clarity, is shown in FIGS. 1 to 4 merely as a black line 16 between layers 11 and 12 or 31 and 32, is arranged between these textile layers.

Material web 30, just like material web 10, also has a first side 32 in the form of an outer material part and a backing 31 in the form of an inner material part.

The first sides 12, 32 (right sides) of material webs 10, 30 are placed one on the other, so that a second edge 34 of the second material web 30, which is situated on an outer boundary of the web, protrudes beyond a first edge 14 on an outer boundary of the first material web 10. In other words, the two material webs 10, 30 are not placed conformingly one on the other with their right sides, but are positioned so that a narrow protruding strip of material web 30 is formed, as shown in FIG. 1. The material webs 10, 30 are then stitched to each other to form a seam 21, so that the two material webs 10, 30 are joined to each other so as to be tear-proof at the seam 21. In this way, a first seam allowance 13 is formed between the seam 21 and the first edge 14 of the first material web 10 and a second seam allowance 23 between the seam 21 and the second edge 34 of the second material web 30. For example, the width of the second seam allowance 33 is at least twice the width of the first seam allowance 13. The material webs 10, 30 are therefore joined to each other in the seam area 3 formed in this way, with formation of different seam allowances 13, 33.

For subsequent joining of the two textile laminates in the form of material webs 10, 30, it can be advantageous, if the textile layers of the outer material part and inner material part are pared on the outer boundary of the corresponding material web. This achieves a situation, wherein the glue can advance more simply up to the barrier layer and penetrate the structure of the barrier layer and seal it. For example, the outer material part 32 of the lower material web 30 is pared over a width of about 13 mm, whereas the backing 11 of the upper material web 10 is pared to a width of about 7 mm. In particular, after paring and superimposition of the material webs, the edge 14 of material web 10 comes to lie on the inner end of the pared surface of material web 30, so that the pared surface of material web 30 simultaneously forms the narrow protruding strip, as shown in FIG. 1. The seam 21 is then formed in the pared surface of the material web 10, for example, with a spacing of 2 mm from the inside end of the pared surface.

With reference to FIG. 2, a part 35 of the second material web 30 that is adjacent to the seam area 3 is folded onto a side facing away from the first material web 10. The outer material part 32 of material web 30 thereby faces outward, whereas the backing or inner material part 32 is directed inward, conforming to the inner material part 11 of material web 10. The folded part 35 is stitched in seam area 3 to form a second seam 22 to the first material web 10 and the unfolded part of the second material web 30, so that the second seam 22 joins the material web 10 to the folded part and to the unfolded part of the second material web 30. Seam 22 here is arranged parallel to the first seam 21 and between this first seam 21 and the edge 14 of material web 10.

To form seam 22, for example, in the form of a stitch seam, the pattern is reversed. The seam allowance is then folded onto the unpared side, so that the pared area also remains visible. The stitch seam is now placed in the area wherein the seam allowance was folded, for example, 1 mm from the contact edge 14.

A glue track is then applied to the seam allowance 33 of material web 30. In principle, in addition to using a silicone glue, all glue systems that can be processed in this manufacturing step could be used. For example, all glues from the group of silicones, polyurethanes, or PVC can be used. The precise parameters then depend on the multilayer laminate and the glue system used.

The second seam allowance 33 is now placed around the first edge 14 of the first material web 10 in such a way that the seam allowance 33 of material web 30 covers both seam 21 and seam 22 to form a seam covering 2. Attachment occurs, for example, by means of a hot press or other appropriate device that presses the seam allowance 33 in seam area 3 with the material web 10, wherein case, the glue is then cured. Curing need not necessarily occur here by increased temperature, but depends on the glue system used. Curing could also occur chemically or by other excitation methods (for example, ultrasound, UV, IR, etc.).

In order to make seams 21 and 22 liquid-tight or waterproof, a narrow glue line is now made in the remaining open edge between the folded part 35 of material web 30 and the unfolded part of material web 30 in seam area 3. This is shown with reference to FIG. 4, wherein a glue 24 is applied at this site in a narrow glue line, for example, with a pipette. The glue 23 applied in the previous processing step is also shown in FIG. 4, which is used to attach the seam cover 2 or seam allowance 23 to the material web 10. The glue line 24 is pressed again with a hot press or other appropriate device and cured.

In general, the seam cover 2 can be attached so as to be liquid-tight and/or gas-tight, whereby the seam cover is sealed, in particular, with a liquid-tight material, such as glue 23, 24, as described.

In this way, a seam-joining structure is created wherein a separate seam strip to seal the joining seam 21 is no longer necessary. Because of this, an advantage is gained in that a color or material difference no longer occurs between the seam strips and the backing material. The seams are also narrower and designed to be softer than a comparable seam with a separate seam strip. The additional advantage is gained that no or strongly reduced visible edge impressions form on the outerwear.

For pressing and curing the silicone glue 23, 24, a pressure of 2.5 bar and a temperature of 150° C. can be used, with an exposure time of 20 seconds. Seams 21, 22 can be made with a commercial sewing machine, for example, in a straight stitch. A silicone-glue system RT601 from Wacker/Burghausen can be used as the glue. A paring machine can be used to pare the corresponding edges, as described above.

Instead of a sewing seam for seams 21, 22, a welded seam or glue seam can also be prescribed, in principle.

High water-tightness on the seam cover 2 can be achieved by attaching the seam cover 2 in the seam area 3 directly to the first material web 10, for example, by means of a glue 23, i.e., attached directly to the material web 10. The seam cover 2 is also directly or indirectly attached to the first seam allowance 13 of the first material web 10, so that the transition site between the first and second material web is well sealed. By means of continuous, liquid-tight glues 23, 24, a liquid-tight seal can be achieved, both at the connection site, and also on the folded part of material web 30 in seam area 3.

A seam joining structure formed in this way can be used advantageously in a clothing article. FIG. 6 shows an example of a clothing article 70 with a seam joining 1 according to the invention. The clothing article is preferably reversible, so that the inner material part or the outer material part of the clothing article can be worn in alternation on the inside or outside. The material webs 10, 30, according to FIGS. 1 to 4, are accordingly made reversible, so that the corresponding outer material part 12, 32 can be used as the corresponding inner material part of the clothing article and, vice versa, the corresponding inner material part 11, 31 can be used as an outer material part of the clothing article. Since the seam is designed to be liquid-tight to both sides, a clothing article with such a seam-joining structure can be used reversibly.

Appropriate materials for the waterproof, water-vapor-permeable functional layer (cf. functional layer 42 according to FIG. 5) include polyurethane, polypropylene, and polyester, including polyether esters and laminates thereof, as described in documents U.S. Pat. No. 4,725,418 and U.S. Pat. No. 4,493,870. However, expanded microporous polytetrafluoroethylene (ePTFE) is particularly preferred, as described in documents U.S. Pat. No. 3,953,566 and U.S. Pat. No. 4,187,390, and expanded polytetrafluoroethylene provided with hydrophilic impregnation agents and/or hydrophobic layers; see document U.S. Pat. No. 4,194,041. A microporous functional layer is understood to mean a functional layer whose average pore size lies between about 0.2 μm and about 0.3 μm.

The pore size can be measured with the Coulter Porometer™, produced by Coulter Electronics, Inc., Hialeah, Fla., USA.

A functional layer is considered "waterproof," optionally including the seams provided on the functional layer, if it guarantees a water entry pressure of at least $1\times10^4$ Pa. The functional layer material preferably guarantees a water entry pressure of more than $1\times10^5$ Pa. The water-entry pressure is measured according to a test method wherein distilled water, at 20±2° C., is applied to a sample of 100 cm² of the functional layer with increasing pressure. The pressure increase of the water is 60±3 cm H$_2$O per minute. The water-entry pressure then corresponds to the pressure at which water first appears on the other side of the sample. Details of the procedure are stipulated in ISO standard 0811 from the year 1981.

A functional layer is considered "water-vapor-permeable", if it has a water-vapor permeability Ret of less than 150 m²×Pa×W$^{-1}$. The water-vapor permeability is tested according to the Hohenstein skin model. This test method is described in DIN EN 31092 (02/94) or ISO 11092 (1993).

The term "air-tight (wind-tight)" means that the barrier layer or material web 10, in combination with the barrier layer, has an air permeability of less than 25 l/m²/s, in many embodiments less than 5 l/m²/s.

Air Permeability:

In order to measure the air permeability of a material web (textile), a test device is used that can measure the air flow through the material web. The test specimens are positioned between two rings, which results in a test area of 100 cm². Air is drawn through the test specimen at a constant pressure of 100 Pa. The amount of air that passes through the test specimen is then measured and calculated in l/m²/s. The test method is described in EN ISO 9237.

EXAMPLE

A 3-ply laminate is made available to produce the seam joining structure. The 3-ply laminate is a commercially available product of W.L. Gore & Associates GmbH, Putzbrunn, Germany, designated Gore Liquid Proof Gown Fabric. This laminate has a first textile layer of polyester with a basis weight of 65 g/m² and the second textile layer of polyester with a basis weight of 50 g/m². A porous membrane of expanded PTFE (ePTFE) is arranged between the two textile layers. The laminate has a basis weight of 170 g/m² and a thickness of about 310-330 μm.

Two webs of this 3-ply laminate were joined to each other to form the seam-joining structure according to the invention. According to the invention, the first seam and the second seam are stitched by a commercial sewing machine. The seam cover 2 is present with a width of about 10-15 mm. In comparison, ordinary seam strips have a seam width between 22-23 mm. For liquid-tight sealing of the seam cover 2 to the first material web 10, and also the folded part 35 of the second material web 30, a silicone glue TRV 601 from Wacker Chemie AG is used.

The seam is waterproof at a pressure of 0.2 bar for 2 minutes, determined according to ISO 811 (1981).

The invention claimed is:

1. A seam-joining structure (1) comprising:
   a first material web (10) with a first barrier layer (42) and with a first edge (14) on an outer boundary of the first material web (10),
   a second material web (30) with a second barrier layer (42) and with a second edge (34) on an outer boundary of the second material web (30), and
   at least one seam (21) that joins the first and second material web (10, 30) in a seam area (3) to form a first seam allowance (13) between seam (21) and the first edge (14) of the first material web, and to form a second seam allowance (33) between the seam (21) and the second edge (34) of the second material web (30),
   wherein the first and second material web (10, 30) are arranged one above the other in the seam area (3) and the second seam allowance (33) is folded around the first edge (14) of the first material web (10) and covers the at least one seam (21) to form a seam cover (2), and
   wherein the seam cover (2) is joined to the first material web (10) in the seam area (3).

2. A seam-joining structure according to claim 1, wherein the seam cover (2) is attached directly to the first material web (10) in the seam area (3).

3. A seam joining structure according to claim 1, wherein the seam cover (2) is attached directly to the first seam allowance (13) of the first material web (10) in the seam area (3).

4. A seam joining structure according to claim 1, wherein:
   the at least one seam (21) is a first seam,
   the seam-joining structure also includes a second seam (22) arranged parallel to the first seam (21) and between the first seam (21) and the first edge (14) of the first material web (10), and
   the second seam (22) joins the first material web (10), the second material web (30), as well as a folded part (35) of the second material web (30), on a side facing away from seam cover (2).

5. A seam-joining structure according to claim 4, wherein the second seam allowance (33) covers the first and second seam (21, 22) to form the seam cover (2).

6. A seam-joining structure according to claim 4, wherein at least one of the first and second seams (21, 22) includes a sewing seam.

7. A seam joining structure according to claim 4, wherein the folded part (35) of the second material web (30) is attached liquid-tight in the seam area (3) to an unfolded part of the second material web (30).

8. A seam joining structure according to claim 4, wherein the folded part (35) of the second material web (30) is joined continuously to an unfolded part of the second material web (30) by means of a glue (24) that creates a liquid-tight seal at the joining site.

9. A seam-joining structure according to claim 1, wherein the at least one seam (21) includes a sewing seam.

10. A seam-joining structure according to claim 1, wherein the second seam allowance (33) has a width that is at least twice the width of the first seam allowance (13).

11. A seam-joining structure according to claim 1, wherein the at least one seam (21) is liquid-tight.

12. A seam joining structure according to claim 1, wherein the seam cover (2) is attached liquid-tight to the first material web (10) in seam area (3).

13. A seam-joining structure according to claim 1, wherein the seam cover (2) is joined continuously to the first material web (10) in seam area (3) by means of a glue (23), which creates a liquid-tight seal at the joining site.

14. A seam-joining structure according to claim 13, wherein the glue (23, 24) is a glue from the silicone group.

15. A seam-joining structure according to claim 1, wherein the first and second barrier layer each has a water-tight functional layer (42).

16. A seam joining structure according to claim 15, wherein the water-tight functional layer or at least one of the first and second barrier layers has a waterproof, water-vapor-permeable membrane (42).

17. A seam joining structure according to claim 1, wherein at least one of the first and second barrier layers (42) is water-vapor-permeable and gas-tight.

18. A seam-joining structure according to claim 1, wherein the first material web (10) has a laminate with at least one textile layer (41, 43), which is arranged on the first barrier layer (42), and the second material web (30) has a laminate with at least one textile layer (41, 43) arranged on the second barrier layer (42).

19. A seam-joining structure according to claim 18, wherein at least one of the textile layers (41, 43) is removed at least in an area with in the first seam allowance (13) or the second seam allowance (33).

20. A seam-joining structure according to claim 1, wherein the at least one seam (21) includes at least one member selected from the group consisting of a single-cap-double-seam, a glue seam and a welding seam.

21. A seam-joining structure according to claim 1, wherein:
the first material web (10) has a first side (12) and an opposite backing (11),
the second material web (30) has a first side (32) and an opposite backing (31),
in which the corresponding first sides (12, 32) of the first and second material webs (10, 30) abut each other in the seam area (3) and are joined in the seam area (3) by at least one seam (21), and
the second seam allowance (33) is folded around the first edge (14) of the first material web (10), so that the first side (32) of the second material web (30) is adjacent to the at least one seam (21) to form a seam cover (2), and is joined in seam area (3) to the backing (11) of the first material web (10).

22. A seam-joining structure according to claim 1, wherein the seam-joining structure is waterproof at a water entry pressure of 0.2 bar for 2 minutes, measured according to ISO 811 (1981).

23. A seam-joining structure according to claim 1, wherein the at least one seam (21) is designed gas-tight.

24. A clothing article (70) with at least a first material web (10) and a second material web (30), and with a seam joining structure (1) according to claim 1 to join the first material web (10) and the second material web (30).

25. A clothing article according to claim 24, wherein the first and second material webs (10, 30), as well as the seam-joining structure (1), are reversible, so that a corresponding upper material part (12, 32) of the first and second material webs (10, 30) can be used as an inner material part of the clothing article (70) and a corresponding inner material part (11, 31) of the first and second material webs (10, 30) can be used as a corresponding outer material part of the clothing article.

26. A method for producing the seam joining structure (1) of claim 1 comprising the steps of:
preparing a first material web (10) with a first barrier layer (42) and a first edge (14) on an outer boundary of the first material web (10),
preparing a second material web (30) with a second barrier layer (42) and with a second edge (34) on an outer boundary of the second material web (30),
positioning the first side (12) of the first material web (10) on a first side (32) of the second material web (30), so that the second edge (34) of the second material web (30) protrudes beyond the first edge (14) of the first material web (10),
forming at least one seam (21) to join the two material webs (10, 30) in a seam area (3) to form a first seam allowance (13) between seam (21) and the first edge (14) of a second seam allowance (33) between seam (21) and the second edge (34),
folding the second seam allowance (33) around the first edge (14) of the first material web (10), so that the second seam allowance (33) covers the at least one seam (21) to form a seam cover (2), and
attaching the seam cover (2) in the seam area (3) to the first material web (10).

27. A method according to claim 26, wherein the seam cover (2) is directly attached in seam area (3) to the first seam allowance (13) of the first material web (10).

28. A method according to claim 26, further comprising the following steps after forming the first seam (21):
folding a part (35) of second material web (30), which is adjacent to the seam area (3), onto a side facing away from the first material web (10),
forming the second seam (22) arranged parallel to the first seam (21) and between the first seam (21) and the first edge (14) of the first material web (10), in which the second seam (22) joins the first material web (10), the second material web (30), as well as the folded part (35) of the second material web,
folding the second seam allowance (33) around the first stage (14) of the first material web (10), so that the second seam allowance (33) covers the first and second seam (21, 22) to form a seam cover (2), and
attaching the seam cover (2) in the seam area (3) to the first material web (10).

29. A method according to claim 28, wherein at least one of the first and second seams (21, 22) is formed by sewing.

30. A method according to claim 26, wherein the at least one seam (21) is formed by sewing.

31. A method according to claim 26, wherein attaching the seam cover (2) results in at least a liquid-tight or a gas-tight material.

* * * * *